Jan. 26, 1954
A. E. FLEMMING
2,667,602
VEHICLE DIRECTIONAL SIGNAL SYSTEM
Filed May 25, 1950
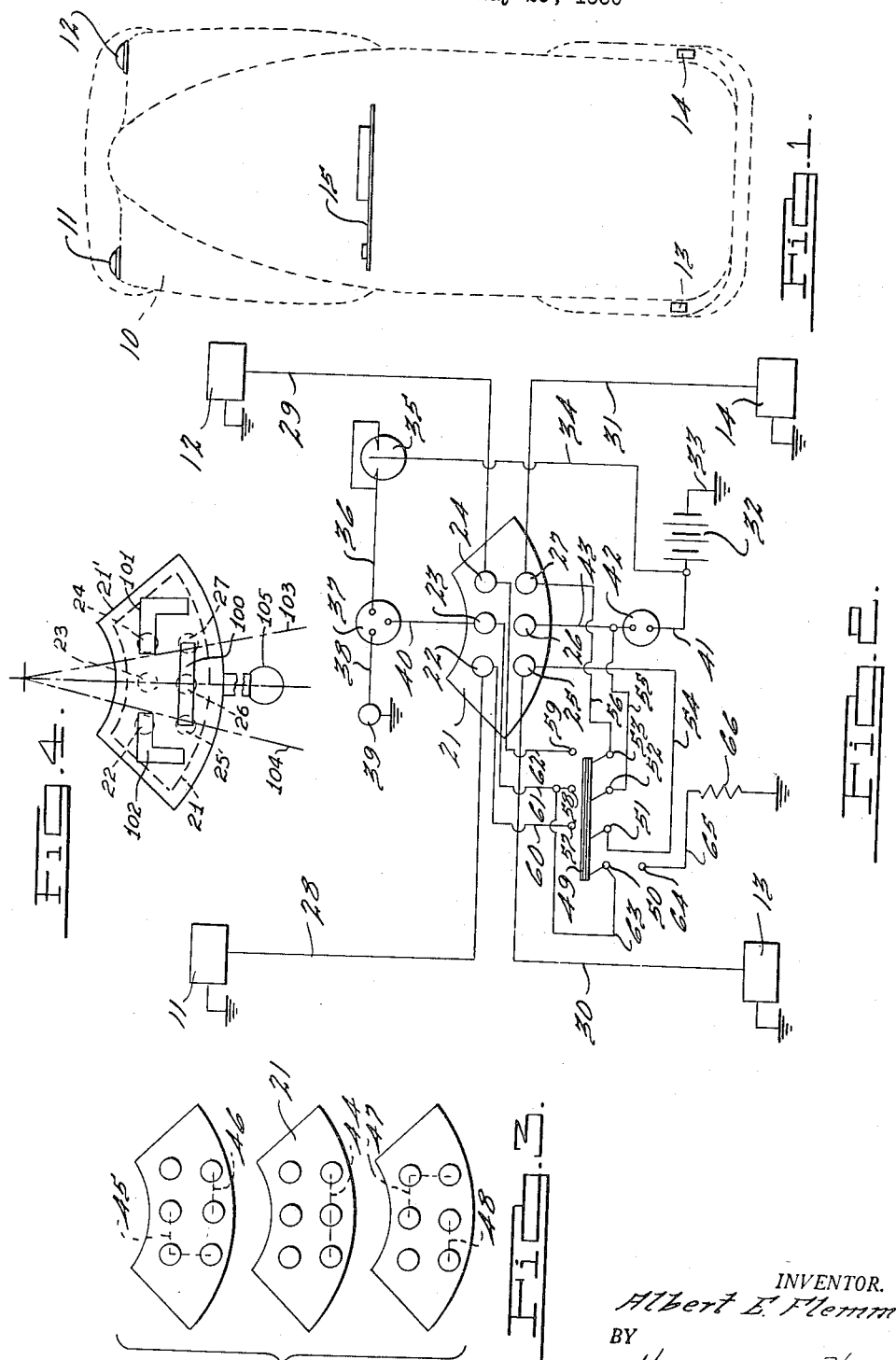
INVENTOR.
*Albert E. Flemming*
BY
*Harness and Harris*
ATTORNEYS Patented Jan. 26, 1954

2,667,602

UNITED STATES PATENT OFFICE 2,667,602

VEHICLE DIRECTIONAL SIGNAL SYSTEM

Albert E. Flemming, Birmingham, Mich., assignor to Chrysler Corporation, Highland Park, Mich., a corporation of Delaware Application May 25, 1950, Serial No. 164,118

4 Claims. (Cl. 315—77)

My invention relates to motor vehicle lighting systems and particularly to an improved directional indicating device.

In the past, motor vehicle directional indicating devices have been utilized primarily for indicating the direction of a contemplated turn of the vehicle. It is proposed to utilize such a system not only to indicate intended turns but stalled or parked vehicles. It is a principal object of my invention to provide a motor vehicle with an improved multi-light indicating device which may be employed to intermittently energize all lights of the device at the same time.

Another object of my invention is to provide apparatus which may be readily and easily attached to vehicles having conventional signaling systems.

A further object of my invention is to provide a vehicle turn indicating system with supplemental means for operating all lights in the system at one time which means are easily and economically manufactured.

Other objects and advantages will become more apparent from the following description of one embodiment of my invention, reference being had to the accompanying drawings in which:

Fig. 1 is a plan view of a vehicle showing the relative positions of the signal indicating portions.

Fig. 2 is a schematic diagram of my improved signaling device.

Fig. 3 is a diagrammatic view showing three positions of the switch shown in Fig. 2.

Fig. 4 is a fragmentary plan view of the switch showing the stationary and movable switch elements in superimposed relation.

The dotted lines at 10 in Fig. 1 indicate the outline of a vehicle body which has indicating lights 11 and 12 disposed at the forward end thereof and indicating lights 13 and 14 at the rear end thereof. The vehicle is provided with an instrument board 15 which is located centrally of the vehicle and which may support a part of the control apparatus of my improved invention.

In Fig. 2, I have shown a schematic diagram of the electrical wiring system of my improved indicating device, the main portion thereof being preferably located on either the steering column (not shown) of the vehicle or the instrument board 15. The indicating lights 11, 12, 13 and 14 are diagrammatically represented in block form. The electrical sytem shown in Fig. 2 is controlled by a switch which is represented at 21 and which includes three upper contacts 22, 23 and 24 and three lower contacts 25, 26 and 27. Lights 11, 12, 13 and 14 each have one terminal grounded on the vehicle and their other terminals are respectively connected by conductors 28, 29, 30 and 31 to contacts 22, 24, 25 and 27 of the switch 21. The system is provided with a source of electrical energy 32, such as the vehicle storage battery, which has one terminal thereof grounded at 33 and which has its other terminal connected through a conductor 34 to one terminal of an ignition switch 35. The other terminal of the ignition switch is connected by a conductor 36 to one contact of a three contact electrical flasher member 37 hereinafter more fully described. Another contact of the flasher member 37 is connected through a conductor 38 to an indicating light 39 which is grounded, the latter being used for light indication, within the interior of the vehicle, when the system is in operation. The flasher member is connected through a conductor 40 to contact 23 on the switch 21.

The source of electrical energy 32 is also connected through a conductor 41 to one side of a brake switch 42, the other side thereof being connected through conductor 43 to contact 26 on the switch 21. Referring now to Fig. 3, I have shown the switch 21 diagrammatically in its three different positions. The center view of the switch 21 illustrates by the dotted lines 44, the neutral position of the switch wherein contacts 25, 26 and 27 are connected together. In the upper view of Fig. 3, the dotted lines 45 and 46 indicate the position to which the switch is operated to energize the front and rear left lights 11 and 13. In this position, contacts 22, 23 and 25 are connected together and contacts 26 and 27 are connected together. In the lower view of Fig. 3, I have shown the relationship of the contacts of the switch 21 when it is operated to effect the energizing of the right front and rear lights 12 and 14. In this position, the dotted lines 47 and 48 show that the contacts 23, 24 and 27 are connected together and the contacts 25 and 26 are connected together.

It will be seen from the schematic diagram in Fig. 2 that the rear right and left lights 13 and 14 are not only utilized to indicate the direction in which the vehicle is going to turn but are also utilized to indicate when the foot brake of the vehicle is applied. When the brake switch 42 is closed, the current from the source of electrical energy 32 passes through the conductors 41 and 43 to the contact 26 and through the conductors 30 and 31 to the lights 13 and 14, respectively, since, as shown in the center view of Fig. 3, the contacts 25, 26 and 27 are connected together when the switch 21 is in its neutral position. When the switch 21 is moved to its left turn position, as indicated by the dotted lines 45 and 46 in Fig. 3, the current passes from the source 32 through the conductor 34, ignition switch 35 and conductor 36 to the flasher member 37. The current passes from the flasher member 37 through conductor 40 to contact 23 on the switch 21 and hence to contacts 22 and 25. The current passes from contact 22 through conductor 28 to the left front light 11 and from contact 25 through conductor 30 to the left rear light 13 and these lights are energized when the switch is in its left turn position. In this position, lights 11 and 13 are flashing on and off due to the action of the flasher member 37. It will be noted, however, that contacts 26 and 27 remain connected together in the left turn position so that the right rear light may be energized in a continuous fashion by closing the brake switch 42. By this system, the indicating flashing signal of the lights may be maintained on one side of the vehicle while the rear light on the other side of the vehicle may still indicate the application of the foot brake of the vehicle. Similarly, when the switch is in its right turn position, as shown in the lower portion of Fig. 3, the current passes, as indicated by the dotted lines 47, from contact 23 to contacts 24 and 27 and hence through conductors 29 and 31 to lights 12 and 14. Also, contacts 25 and 26 remain connected together in this right turn position so that left rear light 13 may be energized when the foot brake switch is closed.

It will be seen in Fig. 2 that the flasher member 37, when energized, always has the same amount of electrical current passing therethrough and in accordance with common practice, the frequency of flashing of the member 37 is directly controlled by the amount of current passing therethrough and the aforementioned frequency is predetermined in accordance with the amount of current which will be required to energize the indicating lights of the vehicle.

In accordance with my invention, I have supplied the switch 21 with supplemental means so that the lights 11, 12, 13 and 14 may be operated simultaneously through the flasher member 37. In order that all lights may be energized at the same time, additional switch means must be added to the indicating system and also additional current carrying means must be employed so that the same amount of current passes through the flasher member 37 at all times that it is being used. To accomplish this result, the system is provided with an additional double throw switch 49. This switch is provided with four central or common contacts 50, 51, 52 and 53. Contacts 51, 52 and 53 are respectively connected through conductors 54, 55 and 56 to contacts 25, 26 and 27 of the main switch 21. The switch 49 is also provided on one side with three contacts 57, 58 and 59 which are respectively connected through conductors 60, 61 and 62 to contacts 22, 23 and 24 of switch 21. Central contact 50 is connected through conductor 63 and conductor 61 to contact 23 of the switch 21. The contact 23 is provided on the opposite side of the switch 49 is provided on the opposite side of the switch 57, 58 and 59 with a contact 64 which is connected through conductor 65 to one side of a resistor 66, the other side thereof being grounded.

It will be seen that the flasher member 37 is constructed to properly operate with a current passing therethrough equal to the sum of the currents which will pass through all lights including 11, 12, 13, 14 and 39. The flasher member 37 is constructed in this manner so that it can properly operate when the indicating system is used in accordance with my invention wherein all lights are being energized in a flashing manner. The amount of current drawn by each of the lights 11, 12, 13 and 14 is the same and the value of the resistor 66 is predetermined to draw the same amount of current as any two of the aforementioned four lights. During normal operation, the switch 49 is in its lower position, that is, the contact 50 is connected to the contact 23 thereby connecting the resistor 66 to the contact 23. In this position, when the switch 21 is moved to either its right turn or left turn position and either the right or left lights are energized, the resistor 66 will draw the equivalent current of the other lights which are not operating thereby drawing the same amount of current through the flasher member 37 as when all lights are operating and the resistor is not in the circuit.

The contacts 22, 23, 24, 25, 26 and 27 of the switch represented at 21 are stationary contacts and they are preferably mounted on a segment of insulating material as shown in the drawing. As shown in Fig. 4, a movable switch element 21' is superimposed over the stationary contacts 22 to 27 and it comprises a segment of insulating material on which are mounted a straight contact bar 100 and right and left hand angular contact bars 101 and 102, respectively. As shown in Fig. 4, the movable switch element is in the neutral position corresponding to the middle view of Fig. 3 in which the lower aligned stationary contacts 25, 26 and 27 are all electrically connected together by the bar 100 and none of the upper aligned stationary contacts 22, 23 and 24 are electrically connected together. When the movable contact element 21' is shifted to bring its center line to the position shown at 103, the angle bar 102 is brought into electrical contact with the three stationary contacts 22, 23 and 25 and the stationary contacts 26 and 27 are connected together by the straight contact bar 100 as illustrated in the upper view of Fig. 3. This setting of the switch produces a left hand turn signal. When the movable switch element is shifted in an opposite direction to bring its center line to the position shown at 104, the right hand angle contact bar 101 electrically connects together stationary contacts 23, 24 and 27 and stationary contacts 25 and 26 are electrically connected together by the straight contact bar 100 as illustrated in the lower view in Fig. 3. This establishes a right hand turn signal. The movable switch element 21' may be conveniently shifted by a handle 105 which is conveniently accessible to a driver.

In accordance with my invention, when it is necessary, as for example, when a car is stalled on a highway to indicate the presence of the car on the highway to oncoming vehicles, the switch 49 is moved to its upper position, as shown in Fig. 2, and contacts 51, 52 and 53 are respectively connected to contacts 57, 58 and 59. In this position and no matter what position switch 21 is in, all of the contacts of switch 21 are connected together thereby energizing all lights and contacts 50 and 64 are separated thereby removing the resistor 66 from the indicating system.

It may be readily seen that my improved apparatus may not only be incorporated into an indicating system when it is built but it may also be added to any conventional indicating system by merely adding the switch 49 and the resistor 66 and changing the flasher member 37 so that operation may be had at the same frequency at a higher current. It should be noted, however, that the supplemental switching means at 49 is shown for illustrative purposes only and that it may be very well incorporated as a fourth position of switch 21 by merely rearranging the contacts in a suitable manner.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a vehicle including first and second light means, a directional indicating system comprising a source of electrical energy, switch means in said system for selectively energizing said light means, light flashing means in said system for raising and lowering the light intensity of said light means, said light flashing means being adapted to operate at a predetermined frequency in response to a predetermined current passing therethrough, and resistance means connected in said system so that the current passing therethrough passes through said light flashing means, said switching means being adapted to simultaneously energize all of said light means and disconnect said resistance means from said system.

2. In a vehicle including first and second light means, a directional indicating system comprising a source of electrical energy, switch means in said system for selectively energizing said light means, a circuit breaking device connected between said source and said switch means and adapted to periodically impede the flow of electrical current to said light means, said circuit breaking means operating at a predetermined frequency in response to a predetermined current passing therethrough, resistance means connected in series with said circuit breaking means so that a portion of the current passing through said circuit breaking means passes through said resistance means, said switching means being adapted to simultaneously energize both of said light means and disconnect said resistance means from said system.

3. In a vehicle including spaced front left and right lighting members and spaced rear left and right lighting members, a directional indicating system comprising a source of electrical energy, a circuit breaking device connected to said source and adapted to function at a predetermined frequency to effect flashing of said lighting member, the frequency and effective operability of said device being controlled by a predetermined current passing therethrough, switching means electrically connected between said lighting members and said circuit breaking device and being movable to first and second positions to electrically energize said front and rear right lighting members and said front and rear left lighting members, respectively, a resistor connected in series with said circuit breaking device so that the current passing therethrough also passes through said device, and supplemental switching means interconnected with said first mentioned switching means for energizing all of said lighting members and disconnecting said resistor.

4. In a vehicle including first and second light means, a directional indicating system comprising a source of electrical energy, switch means in said system for selectively energizing said light means, light flashing means in said system for raising and lowering the light intensity of said light means, said light flashing means being adapted to operate at a predetermined frequency in response to a predetermined current passing therethrough, resistance means connected in said system so that the current passing therethrough passes through said light flashing means, and a supplemental switch in said system having first and second positions, said first position connecting said resistance means in series with said light flashing means and said second position disconnecting said resistance means from said system and short circuiting said switch means.

ALBERT E. FLEMMING.

References Cited in the file of this patent

UNITED STATES PATENTS

| Number | Name | Date |
|---|---|---|
| 1,704,709 | Murray | Mar. 12, 1929 |
| 1,717,629 | Sawyer | June 18, 1929 |
| 1,801,236 | Brown | Apr. 14, 1931 |
| 2,086,959 | Rom | July 13, 1937 |
| 2,090,332 | O'Neil | Aug. 17, 1937 |
| 2,122,508 | Bell | July 5, 1938 |